US012755556B2

(12) United States Patent
Segawa et al.

(10) Patent No.: US 12,755,556 B2
(45) Date of Patent: Oct. 6, 2026

(54) IMAGE RECOGNITION SYSTEM, IMAGE RECOGNITION METHOD, AND ENTRY SYSTEM

(71) Applicant: HONDA MOTOR CO., LTD., Tokyo (JP)

(72) Inventors: Toku Segawa, Tokyo (JP); Genki Inohana, Tokyo (JP); Seonghun Lee, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 35 days.

(21) Appl. No.: 19/060,196

(22) Filed: Feb. 21, 2025

(65) Prior Publication Data

US 2025/0308250 A1 Oct. 2, 2025

(30) Foreign Application Priority Data

Mar. 29, 2024 (JP) ................................ 2024-055948

(51) Int. Cl.
*G06V 20/00* (2022.01)
*G06V 20/58* (2022.01)

(52) U.S. Cl.
CPC .......... *G06V 20/58* (2022.01); *G06V 2201/07* (2022.01)

(58) Field of Classification Search
CPC ........ G06V 20/00; G06V 40/00; H04N 23/00; H04L 63/00; H04L 9/00
See application file for complete search history.

(56) References Cited

U.S. PATENT DOCUMENTS

2014/0207344 A1* 7/2014 Ihlenburg ................ E05F 15/73 701/49
2025/0196768 A1* 6/2025 Burtch .................. H04N 7/188

FOREIGN PATENT DOCUMENTS

JP 2016-079692 A 5/2016

* cited by examiner

*Primary Examiner* — Maryam A Nasri
(74) *Attorney, Agent, or Firm* — Rankin, Hill & Clark LLP

(57) ABSTRACT

An image recognition system includes: an acquisition unit that acquires a captured image from a camera mounted on a vehicle; a person recognition unit that recognizes a human in the captured image; and a determination unit that takes the human in the captured image as a subject person, and determines, from the captured image, whether or not the subject person is carrying baggage. The determination unit extracts a partial image from the captured image, the partial image having a predetermined shape and size and including a hand of the subject person in the captured image, and, when an image pattern different from a background image is recognized at a tip of the hand in the partial image, determines that the subject person is carrying baggage.

7 Claims, 4 Drawing Sheets

IMAGE RECOGNITION SYSTEM, IMAGE RECOGNITION METHOD, AND ENTRY SYSTEM

INCORPORATION BY REFERENCE

The present application claims priority under 35 U.S.C. § 119 to Japanese Patent Application No. 2024-055948 filed on Mar. 29, 2024. The content of the application is incorporated herein by reference in its entirety.

BACKGROUND OF THE INVENTION

Field of the Invention

The present invention relates to an image recognition system, an image recognition method, and an entry system.

Description of the Related Art

Japanese Patent Application Laid-Open No. 2016-79692 discloses a vehicle door control device that captures a peripheral image of a person near a vehicle door, and automatically executes a vehicle door opening operation when it is presumed, based on the peripheral image that, both hands of the person are full. This vehicle door control device learns images of objects subject to detection in advance, recognizes the image of a learned object included in the peripheral image, and, when the recognized learned object in the peripheral image is in contact with a part of the person, determines that the person is carrying baggage.

The purpose of the present invention is to provide an image recognition system, an image recognition method, and an entry system that can determine whether or not a person is carrying an object even when images of objects that may be personal belongings detection targets (i.e., objects that may be subject to personal belongings detection) have not been learned in advance.

SUMMARY OF THE INVENTION

One aspect of the present invention is an image recognition system including: an acquisition unit that acquires a captured image from a camera mounted on a vehicle; a person recognition unit that recognizes a human in the captured image; and a determination unit that takes the human in the captured image as a subject person, and determines, from the captured image, whether or not the subject person is carrying baggage, wherein the determination unit extracts a partial image from the captured image, the partial image having a predetermined shape and size and including a hand of the subject person in the captured image, and, when an image pattern different from a background image in the partial image is recognized at a tip of the hand in the partial image, determines that the subject person is carrying baggage.

Another aspect of the present invention is an image recognition method to be executed by a computer of an image recognition system, the image recognition method including: an acquisition step of acquiring a captured image from a camera mounted on a vehicle; a recognition step of recognizing a human in the captured image; and a determination step of taking the human in the captured image as a subject person, and determining, from the captured image, whether or not the subject person is carrying baggage, wherein, in the determination step, a partial image is extracted from the captured image, the partial image having a predetermined shape and size and including a hand of the subject person in the captured image, and, when an image pattern different from a background image in the partial image is recognized at a tip of the hand in the partial image, the subject person is determined to be carrying baggage.

Yet another aspect of the present invention is an entry system including the image recognition system, and a control unit that automatically opens and closes a door of the vehicle, wherein, when the determination unit of the image recognition system determines that the subject person is carrying baggage, the control unit automatically opens the door closest to the subject person.

According to the aspects of the present invention, it is possible to provide an image recognition system, an image recognition method, and an entry system that can determine whether or not a person is carrying an object even when images of objects subject to personal belongings detection have not been learned in advance.

DETAILED DESCRIPTION OF THE INVENTION

Hereinafter, embodiments of the present invention will be described with reference to the drawings.

1. Configuration of Vehicle

Figure 1:
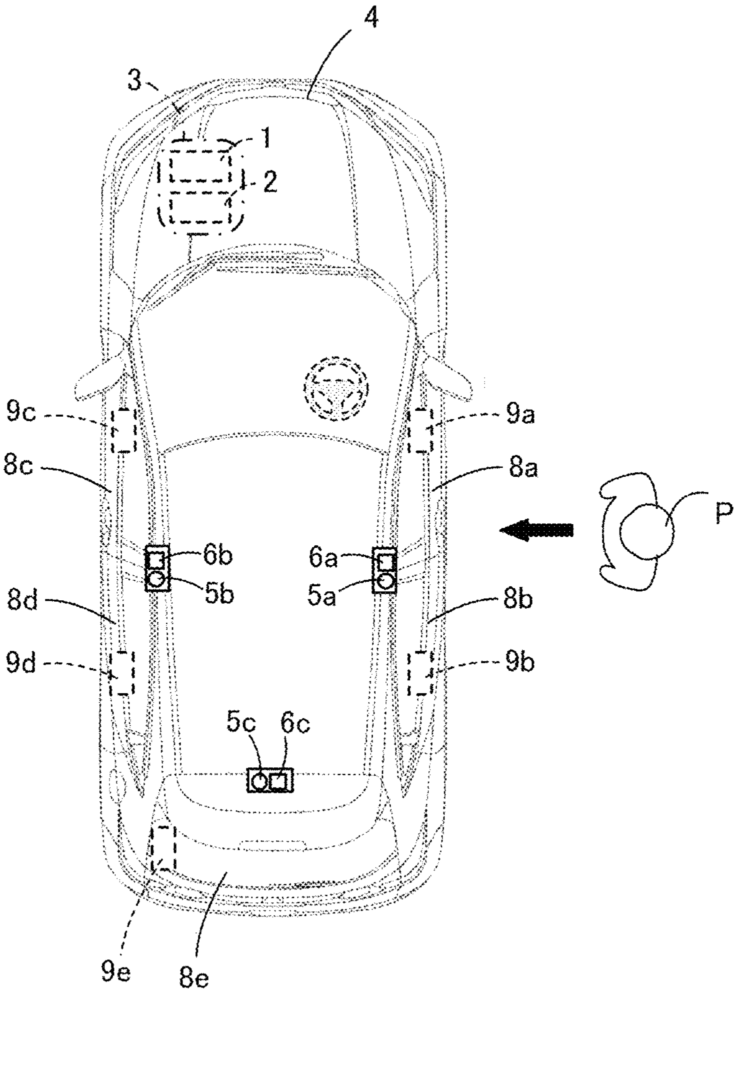
FIG. 1 is a view showing a configuration of a vehicle equipped with an entry system including an image recognition system according to an embodiment of the present invention.

FIG. 1 is a view showing a configuration of a vehicle 4 equipped with an entry system 3 including an image recognition system 1 according to an embodiment of the present invention. The entry system 3 includes the image recognition system 1 and an entry control device 2.

The image recognition system 1 determines whether or not a subject person P who is any person approaching the vehicle 4 is carrying baggage.

The entry control device 2 authenticates whether or not the subject person P is a registered user registered in advance as a person having legitimate authority to use the vehicle 4. When the entry control device 2 authenticates that the subject person P is a registered user and the image recognition system 1 determines that the subject person P is carrying baggage, the entry control device 2 executes an automatic opening operation for automatically opening a door 8 of the vehicle 4.

The vehicle 4 in the present embodiment is, for example, a passenger car, and may be a shared car that a plurality of people can ride. Note that the vehicle 4 is not limited to a passenger car, and may be any vehicle. Such vehicles may be a passenger car, a bus, a taxi, a train, etc.

Provided in a right side portion of the vehicle 4 are a right object detection sensor 5*a* that detects an object existing rightward of the vehicle 4, and a right camera 6*a* that captures an image rightward of the vehicle 4.

Provided in a left side portion of the vehicle 4 are a left object detection sensor 5*b* that detects an object existing leftward of the vehicle 4, and a left camera 6*b* that captures an image leftward of the vehicle 4.

Provided in a rear portion of the vehicle 4 are a rear object detection sensor 5*c* that detects an object existing rearward of the vehicle 4, and a rear camera 6*c* that captures an image rearward of the vehicle 4.

Hereinafter, the right object detection sensor 5*a*, the left object detection sensor 5*b*, and the rear object detection sensor 5*c* are described as the object detection sensors 5 if there is no need to distinguish the right object detection sensor 5*a*, the left object detection sensor 5*b*, and the rear object detection sensor 5*c* from each other. The right camera 6*a*, the left camera 6*b*, and the rear camera 6*c* are also described as the cameras 6 if there is no need to distinguish the right camera 6*a*, the left camera 6*b*, and the rear camera 6*c* from each other.

The camera 6 is, for example, a CCD camera. Further, the object detection sensor 5 is, for example, a distance measurement sensor capable of detecting an object in the surroundings and measuring the distance to the object, and, in the present embodiment, for example, the object detection sensor 5 is a millimeter wave radar. The object detection sensor 5 is not limited to radar and may be any distance measurement sensor capable of detecting an object and measuring a distance. Such sensors may be, for example, light detection and ranging (LiDar) or sonar sensors as well as radar.

The vehicle 4 also includes a door opener and closer 9 provided for each door 8 of the vehicle 4 to lock/unlock the door 8 and open/close the door 8. The door opener and closer 9 may have an actuator for locking and unlocking the corresponding door 8, and an actuator for opening and closing the door 8.

In the present embodiment, the vehicle 4 includes, as the door 8 and the door opener and closer 9, a right-front door opener and closer 9*a* mounted to a driver's seat door 8*a* at the right front of the vehicle 4, and a right-rear door opener and closer 9*b* mounted to a right-rear seat door 8*b* at the right rear of the vehicle 4. Moreover, the vehicle 4 includes a left-front door opener and closer 9*c* mounted to a passenger seat door 8*c* at the left front of the vehicle 4, and a left-rear door opener and closer 9*d* mounted to a left-rear seat door 8*d* at the left rear of the vehicle 4. The vehicle 4 further includes a back door opener and closer 9*e* mounted to a back door (tailgate door) 8*e* of the vehicle 4.

2. Configuration of Entry System

Next, a configuration of the entry system 3 will be described.

Figure 2:
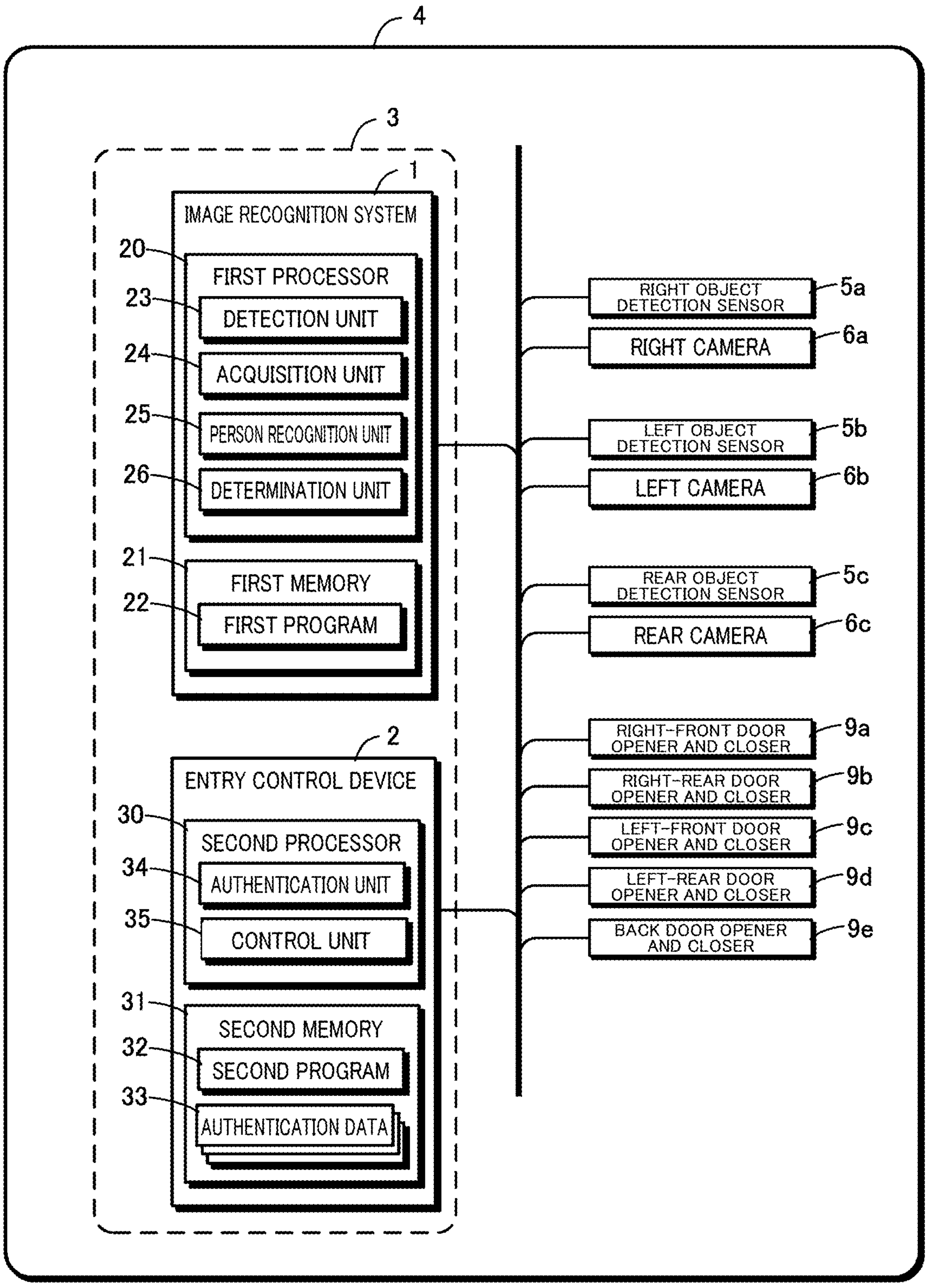
FIG. 2 is a diagram showing a configuration of the image recognition system.

FIG. 2 is a diagram showing the configuration of the entry system 3. The entry system 3 includes the image recognition system 1 and the entry control device 2.

Note that a "subject person" in the following is a person who is the subject of authentication by the entry system 3. Further, a "user" is a registered user who has been registered in advance as a person having legitimate authority to use the vehicle 4, and the person who actually uses the vehicle 4. When a subject person P is authenticated by the entry control device 2 described later and is permitted to use the vehicle 4, the subject person P becomes the user.

The image recognition system 1 acquires an image of an object that has approached the periphery of the vehicle 4, and performs an image recognition process for the acquired image. The image recognition system 1 determines whether or not the object is a person approaching the vehicle 4, that is, whether or not the object is the subject person P approaching the vehicle 4.

When the object is the subject person P, the image recognition system 1 sends a facial image of the subject person P to the entry control device 2. Further, when the object is the subject person P, the image recognition system 1 determines, based on the image of the subject person P approaching the vehicle 4, whether or not the subject person P is carrying an object (baggage). The image recognition system 1 sends the determination result to the entry control device 2.

The entry control device 2 authenticates, based on the facial image of the subject person P sent from the image recognition system 1, whether or not the subject person P is a registered user registered in advance as a person having legitimate authority to use the vehicle 4. When the subject person P is authenticated as the registered user, the entry control device 2 executes an automatic unlocking operation for automatically unlocking the door 8 of the vehicle 4. Further, when the entry control device 2 authenticates that the subject person P is the registered user and when the image recognition system 1 determines that the subject person P is carrying baggage, the entry control device 2 executes an automatic opening operation for automatically opening the unlocked door 8 of the vehicle 4.

2.1. Configuration of Image Recognition System

The image recognition system 1 includes a first processor 20 and a first memory 21. The first memory 21 is constituted by, for example, a volatile and/or non-volatile semiconductor memory, and/or a hard disk device.

The first processor 20 is, for example, a computer including a CPU and the like. The first processor 20 may be configured to include a ROM in which a program has been written, a RAM for temporarily storing data, etc. Further, the first processor 20 includes a detection unit 23, an acquisition unit 24, a person recognition unit 25, and a determination unit 26 as functional elements or functional units.

These functional elements of the first processor 20 are realized by, for example, the first processor 20 as a computer executing a first program 22 stored in the first memory 21. Note that the first program 22 can be stored in any computer-readable recording medium. Alternatively, it is possible to configure all or some of the functional elements of the first processor 20 by hardware respectively including one or more electronic circuit components.

The detection unit 23 determines whether or not an object has entered within a predetermined range of a predetermined distance from the vehicle 4 by the object detection sensor 5. When the object has entered within the range of the predetermined distance from the vehicle 4, the detection unit 23 notifies the acquisition unit 24 of this fact.

When the acquisition unit 24 receives the notification from the detection unit 23 that the object has entered within the range of the predetermined distance from the vehicle 4, the acquisition unit 24 activates the camera 6 near the object detection sensor 5 that detected the object.

The acquisition unit 24 continues to acquire captured images of the periphery of the vehicle 4, including an image of the object, at a predetermined time interval, using the activated camera 6. The acquisition unit 24 sends the acquired captured images to the person recognition unit 25 and the determination unit 26.

The person recognition unit 25 recognizes a human in the captured images sent from the acquisition unit 24. For example, the person recognition unit 25 recognizes a human in the captured images by performing pattern matching with standard images of humans stored in the first memory 21 in accordance with conventional technology. When the person recognition unit 25 has recognized a human in the captured image, the person recognition unit 25 notifies the determination unit 26 of this fact.

Moreover, when the person recognition unit 25 has recognized a human in the captured image, the person recognition unit 25 determines, based on the time-series captured images sent from the acquisition unit 24, whether or not the human is approaching the camera 6 (and consequently whether or not the human is approaching the vehicle 4). Then, when the human in the captured image is approaching, the person recognition unit 25 extracts a facial image of the human from the captured image, and transmits the facial image to the entry control device 2.

When the determination unit 26 receives the notification of recognition of the human in the captured image from the person recognition unit 25, the determination unit 26 takes the human in the captured image sent from the acquisition unit 24 as the subject person P, and determines, based on the captured image, whether or not the subject person P is carrying baggage (an object).

Figure 3:
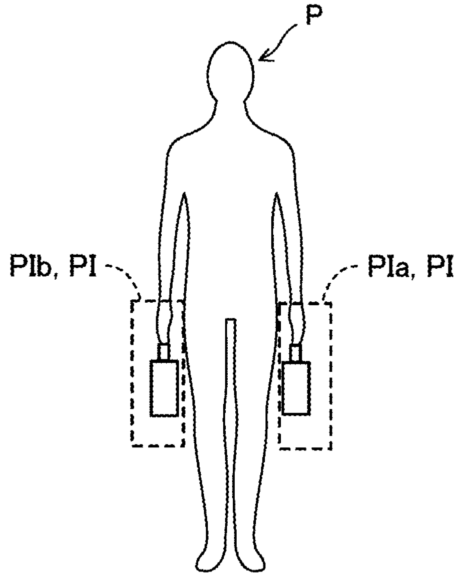
FIG. 3 is an explanatory view for explaining a process for determining whether or not a person is carrying baggage, in the image recognition system.

FIG. 3 is an explanatory view for explaining a process for determining whether or not the subject person P is carrying baggage, in the determination unit 26. FIG. 3 shows an example of a captured image including the subject person P sent from the acquisition unit 24.

As shown in FIG. 3, in the present embodiment, the determination unit 26 particularly extracts, from the captured image sent from the acquisition unit 24, partial images PI of the subject person P in the captured image, the partial images PI having a predetermined shape and size and including respectively hands of the subject person P. Then, when the determination unit 26 recognizes, at the tip of the hand in a partial image PIa that is the partial image PI with respect to the right hand, an image pattern different from a background image in the partial image PIa, the determination unit 26 determines that the subject person P is carrying baggage in the right hand. On the other hand, when the determination unit 26 does not recognize an image pattern different from the background image in the partial image PIa at the tip of the hand in the partial image PIa with respect to the right hand, the determination unit 26 determines that the subject person P is not carrying any baggage in the right hand.

Moreover, when the determination unit 26 recognizes, at the tip of the hand in a partial image PIb that is the partial image PI with respect to the left hand, an image pattern different from a background image in the partial image PIb, the determination unit 26 determines that the subject person P is carrying baggage in the left hand. On the other hand, when the determination unit 26 does not recognize an image pattern different from the background image in the partial image PIb at the tip of the hand in the partial image PIb with respect to the left hand, the determination unit 26 determines that the subject person P is not carrying any baggage in the left hand.

Here, whether or not there is an image pattern different from the background image of each partial image PI at the tip of the hand in the partial image PI can be determined by, for example, converting the partial image PI and the background image into binary images and labeling pixels in accordance with conventional technology. For example, when a labeling pattern different from a labeling pattern in the background image is recognized in the partial image PI, it can be determined that an image pattern different from the background image exists in the partial image PI. For the conversion into binary images, threshold luminance (threshold luminance for black and white discrimination) during the binary image conversion may be adjusted based on luminance distributions in the hand image so that an image range having features similar to features of the hand (for example, the hue, saturation and brightness of the hand, and two-dimensional distribution state thereof) can be effectively extracted by labeling the pixels.

Note that, when there is no right hand or left hand subject to determination in the captured image, the determination unit 26 selects a captured image showing the right hand of the subject person P, a captured image showing the left hand, and/or a captured image showing both the right and left hands from among the plurality of captured images captured at the predetermined time interval and sent from the acquisition unit 24, performs the above-described process on the selected captured images, and can thus determine whether or not the subject person P is carrying baggage in the right hand and/or left hand.

The background image can be, for example, an image of a part of another captured image corresponding to the partial image PI, the other captured image being different from the captured image from which the partial image PI including the tip of the hand of the subject person P was extracted. Moreover, the other image can be an image captured by the acquisition unit 24 when the vehicle 4 was stopped, an image captured by the acquisition unit 24 at the time an object entering within the range of the predetermined distance from the vehicle 4 was detected, or an image captured by the acquisition unit 24 before the determination unit 26 determines whether or not the subject person P is carrying baggage. For example, when the vehicle velocity of the vehicle 4 obtained from an electronic control device (not shown) provided in the vehicle 4 is less than a predetermined velocity, the acquisition unit 24 can detect that the vehicle 4 has stopped. Further, the time at which an object entering within the range of the predetermined distance from the vehicle 4 was detected can be the time at which the acquisition unit 24 received, from the detection unit 23, a notification of the detection of the object entering within the range of the predetermined distance from the vehicle 4.

The determination unit 26 transmits the determination results as to whether or not the subject person P is carrying baggage in the right hand and the left hand to the entry control device 2.

2.2 Configuration of Entry Control Device

The entry control device 2 includes a second processor 30 and a second memory 31. The second memory 31 is constituted by, for example, a volatile and/or non-volatile semiconductor memory, and/or a hard disk device or the like. The second memory 31 stores authentication data 33 for each one or more registered users registered in advance as persons having legitimate authority to use the vehicle 4. The authentication data 33 may be, for example, data of features in the registered user's facial image captured in advance.

The second processor 30 is, for example, a computer including a CPU and the like. The second processor 30 may be configured to include a ROM in which a program has been written, a RAM for temporarily storing data, etc.

Further, the second processor 30 includes an authentication unit 34 and a control unit 35 as functional elements or functional units.

These functional elements of the second processor 30 are realized by, for example, the second processor 30 as a computer executing a second program 32 stored in the second memory 31. Note that the second program 32 can be stored in any computer-readable recording medium. Alternatively, it is possible to configure all or some of the functional elements of the second processor 30 by hardware respectively including one or more electronic circuit components.

The authentication unit 34 authenticates, based on the facial image of the subject person P received from the image recognition system 1, whether or not the subject person P is a registered user. Specifically, in accordance with conventional technology, the authentication unit 34 verifies the received facial image of the subject person P with the authentication data 33 of each registered user recorded in the second memory 31, and, when the degree of matching between the facial image of the subject person P and the authentication data 33 of any one of the registered users is equal to or greater than a predetermined degree, the authentication unit 34 authenticates the subject person P as a registered user.

When the authentication unit 34 authenticates the subject person P as a registered user, the authentication unit 34 causes the control unit 35 to permit the subject person P to enter the vehicle 4.

The control unit 35 controls the operation of the door opener and closer 9 to automatically lock and unlock the door 8 of the vehicle 4 and automatically open and close the door 8 of the vehicle 4. Specifically, when the control unit 35 receives a permission for the subject person P to enter the vehicle 4 from the authentication unit 34, the control unit 35 instructs the door opener and closer 9 to automatically unlock the door 8 of the vehicle 4 (automatic unlocking operation). Further, when the authentication unit 34 has authenticated that the subject person P is a registered user and when the control unit 35 receives a notification that the image recognition system 1 has determined that the subject person P is carrying baggage, the control unit 35 automatically opens the unlocked door 8 of the vehicle 4 (automatic opening operation).

Alternatively, when the authentication unit 34 has authenticated that the subject person P is a registered user and when the control unit 35 receives a notification that the image recognition system 1 has determined that the subject person P is carrying baggage in both hands, the control unit 35 may automatically open the unlocked door 8 of the vehicle 4.

The door 8 of the vehicle 4 subject to the automatic unlocking operation and automatic opening operation can be the door 8 closest to the position of the subject person P. The door 8 closest to the subject person P can be determined by the control unit 35, based on, for example, information identifying the camera 6 used by the acquisition unit 24 for the acquisition of the captured image, and information about the position of the subject person P in the captured image (for example, whether the subject person P is on the left side or the right side of the center line in the captured image). The information identifying the camera 6 and the information about the subject person P in the captured image can be collected by the determination unit 26 of the image recognition system 1 and transmitted to the entry control device 2.

3. Operation of Image Recognition System

Next, the operation procedure of the image recognition system 1 will be described.

Figure 4:
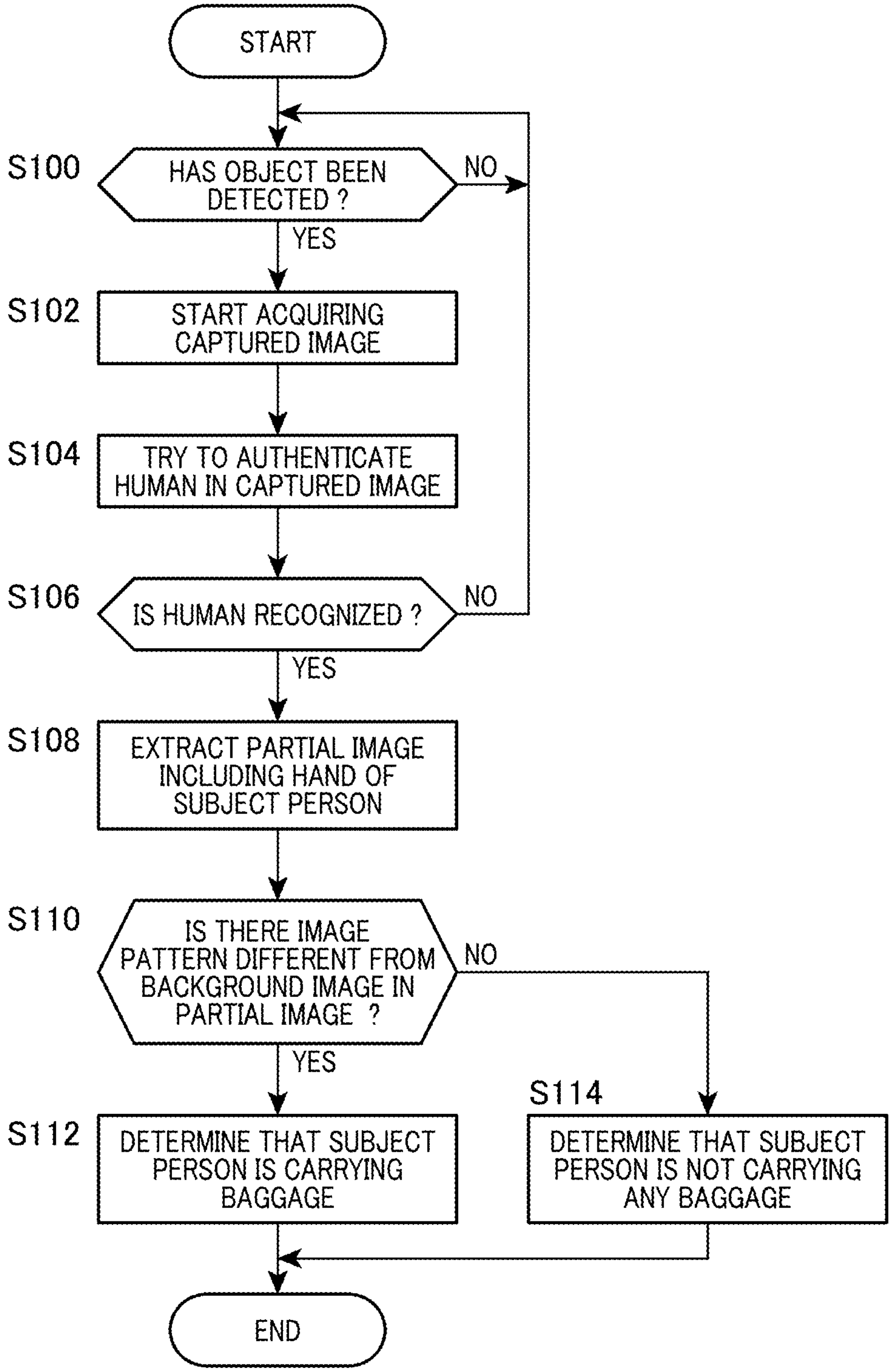
FIG. 4 is a flowchart showing the processing procedure of an image recognition method that the image recognition system executes.

FIG. 4 is a flowchart showing the procedure of an image recognition method that the first processor 20 as a computer of the image recognition system 1 executes.

When the power of the image recognition system 1 is turned on, a process shown in FIG. 4 is started and executed repeatedly.

When the process is started, first, the detection unit 23 determines whether or not an object has been detected within the range of a predetermined distance from the vehicle 4 by one of the object detection sensors 5 (S100). Then, when no object has been detected (NO in S100), the detection unit 23 returns to step S100, repeats the process, and waits until an object is detected within the range of the predetermined distance from the vehicle 4.

On the other hand, when an object has been detected within the range of the predetermined distance from the vehicle 4 (YES in S100), the acquisition unit 24 starts acquiring a captured image of the periphery of the vehicle 4, including an image of the object, using the camera 6 closest to the object detection sensor 5 that has detected the object (S102). The acquisition unit 24 continuously acquires captured images of the periphery of the vehicle 4, including the image of the object, at a predetermined time interval, and sends the acquired captured images to the person recognition unit 25 and the determination unit 26.

The person recognition unit 25 tries to recognize a human in the captured image sent from the acquisition unit 24 (S104), and determines whether or not the human in the captured image is recognized (S106). Then, when the human in the captured image cannot be recognized (NO in S106), the person recognition unit 25 returns the process to step S100.

On the other hand, when the human in the captured image can be recognized (YES in S106), the determination unit 26 executes steps S108 to S114, takes the human in the captured image sent from the acquisition unit 24 as a subject person P, and determines, based on the captured image, whether or not the subject person P is carrying baggage.

First, the determination unit 26 extracts, from the captured image sent from the acquisition unit 24, a partial image PI having predetermined shape and size and including a hand of the subject person P in the captured image (S108). Next, the determination unit 26 determines whether or not, at the tip of the hand in the extracted partial image PI, an image pattern different from the background image in the partial image PI can be recognized (S110). Then, when an image pattern different from the background image can be recognized in the partial image PI (YES in S110), the determination unit 26 determines that the subject person P is carrying baggage (S112), and ends this process. On the other hand, when an image pattern different from the background image cannot be recognized in the partial image PI (NO in S110), the determination unit 26 determines that the subject person P is not carrying any baggage (S114), and ends this process. The determination unit 26 transmits the determination result in step S112 or S114 to the entry control device 2 at the time of ending this process.

Here, in FIG. 4, step S102 corresponds to the acquisition step of the present disclosure. Moreover, steps S104 to S106 correspond to the recognition step of the present disclosure. Further, steps S108 to S114 correspond to the determination step of the present disclosure.

4. Another Embodiment

Although the image recognition system 1 is configured as a single device in the above-described embodiment, the image recognition system 1 may be constituted by a plurality of devices. For example, a plurality of devices may have the functional elements of the first processor 20 in a dispersed manner, and these devices can constitute the image recognition system 1 in cooperation with each other.

Similarly, although the entry control device 2 is configured as a single device in the above-described embodiment, the entry control device 2 may be constituted by a plurality of devices. For example, a plurality of devices may have the functional elements of the second processor 30 in a dispersed manner, and these devices may function as a system in cooperation with each other to realize the functions of the entry control device 2.

Note that, the present invention is not limited to the configurations of the embodiments, and can be implemented in various forms within a range not departing from the gist of the invention.

5. Configurations Supported by Embodiments

The embodiments support the following configurations.

(Configuration 1) An image recognition system including: an acquisition unit that acquires a captured image from a camera mounted on a vehicle; a person recognition unit that recognizes a human in the captured image; and a determination unit that takes the human in the captured image as a subject person, and determines, from the captured image, whether or not the subject person is carrying baggage, wherein the determination unit extracts a partial image from the captured image, the partial image having a predetermined shape and size and including a hand of the subject person in the captured image, and, when an image pattern different from a background image in the partial image is recognized at a tip of the hand in the partial image, determines that the subject person is carrying baggage.

According to the image recognition system of configuration 1, without learning images of objects subject to detection of personal belongings in advance, it is possible to determine that the person is carrying an object.

(Configuration 2) The image recognition system according to configuration 1, wherein, when an image pattern different from a background image in the partial image is not recognized at the tip of the hand in the partial image, the determination unit determines that the subject person is not carrying any baggage.

According to the image recognition system of configuration 2, without learning images of objects subject to detection of personal belongings in advance, it is possible to determine that the person is not carrying any object.

(Configuration 3) The image recognition system according to configurations 1 or 2, wherein the background image is an image of a part of another captured image corresponding to the partial image, the other captured image being different from the captured image from which the partial image was extracted.

According to the image recognition system of configuration 3, without learning images of objects subject to detection of personal belongings in advance, it is possible to determine whether or not the person is carrying an object by comparing the partial image including the hand of the person with the background image.

(Configuration 4) The image recognition system according to configuration 3, wherein the other captured image is an image captured by the acquisition unit when the vehicle was stopped, an image captured by the acquisition unit when an object approached within a range of a predetermined distance from the vehicle, or an image captured by the acquisition unit before the determination unit determines whether or not the subject person is carrying baggage.

According to the image recognition system of configuration 4, it is possible to acquire a background image from a captured image captured at a time when there was a low possibility that a person was captured in the image, compare the partial image including the hand of the person with the background image, and determine whether or not the person is carrying an object.

(Configuration 5) An image recognition method to be executed by a computer of an image recognition system, the image recognition method including: an acquisition step of acquiring a captured image from a camera mounted on a vehicle; a recognition step of recognizing a human in the captured image; and a determination step of taking the human in the captured image as a subject person, and determining, from the captured image, whether or not the subject person is carrying baggage, wherein, in the determination step, a partial image is extracted from the captured image, the partial image having a predetermined shape and size and including a hand of the subject person in the captured image, and, when an image pattern different from a background image in the partial image is recognized at a tip of the hand in the partial image, the subject person is determined to be carrying baggage.

According to the image recognition method of configuration 5, the same effects as configuration 1 are achieved.

(Configuration 6) An entry system including: the image recognition system according to any one of configurations 1 to 4; and a control unit that automatically opens and closes a door of the vehicle, wherein, when the determination unit of the image recognition system determines that the subject person is carrying baggage, the control unit automatically opens the door closest to the subject person.

According to the entry system of configuration 6, without learning images of objects subject to detection of personal belongings in advance, it is possible to properly determine whether or not a subject person trying to enter the vehicle is carrying an object, and it is possible to automatically open the door of the vehicle when the subject person is successfully authenticated, thereby realizing smooth entry of the subject person into the vehicle.

(Configuration 7) The entry system according to configuration 6, wherein, when the determination unit of the image recognition system determines that the subject person is carrying baggage in each of left and right hands, the control unit automatically opens the door closest to the subject person.

According to the entry system of configuration 7, it is possible to properly determine whether or not a person trying to enter the vehicle is carrying objects in both hands, and it is possible to automatically open the door of the vehicle when the subject person is successfully authenticated, thereby realizing smooth entry of the subject person into the vehicle.

REFERENCE SIGNS LIST

1 . . . image recognition system, 2 . . . entry control device, 3 . . . entry system, 4 . . . vehicle, 5 . . . object detection sensor, 5*a* . . . right object detection sensor, 5*b* . . . left object detection sensor, 5*c* . . . rear object detection sensor, 6 . . . camera, 6*a* . . . right camera, 6*b* . . . left camera, 6*c* . . . rear camera, 8 . . . door, 8*a* . . . driver's seat door, 8*b* . . . right-rear seat door, 8*c* . . . passenger's seat door, 8*d* . . . left-rear seat door, 8*e* . . . back door, 9 . . . door opener and closer, 9*a* . . . right-front door opener and closer, 9*b* . . . right-rear door opener and closer, 9*c* . . . left-front door opener and closer, 9*d* . . . left-rear door opener and closer, 9*e* . . . back door opener and closer, 20 . . . first processor, 21 . . . first memory, 22 . . . first program, 23 . . . detection unit, 24 . . . acquisition unit, 25 . . . person recognition unit, 26 . . . determination unit, 30 . . . second processor, 31 . . . second memory, 32 . . . second program, 33 . . . authentication data, 34 . . . authentication unit, and 35 . . . control unit.

The invention claimed is:

1. An image recognition system comprising:

an acquisition unit that acquires a captured image from a camera mounted on a vehicle;

a person recognition unit that recognizes a human in the captured image; and a determination unit that takes the human in the captured image as a subject person, and determines, from the captured image, whether or not the subject person is carrying baggage, wherein the determination unit extracts a partial image from the captured image, the partial image having a predetermined shape and size and including a hand of the subject person in the captured image, and, when an image pattern different from a background image in the partial image is recognized at a tip of the hand in the partial image, determines that the subject person is carrying baggage.

2. The image recognition system according to claim 1, wherein, when an image pattern different from a background image in the partial image is not recognized at a tip of the hand in the partial image, the determination unit determines that the subject person is not carrying any baggage.

3. The image recognition system according to claim 1, wherein the background image is an image of a part of another captured image corresponding to the partial image, the other captured image being different from the captured image from which the partial image was extracted.

4. The image recognition system according to claim 3, wherein the other captured image is an image captured by the acquisition unit when the vehicle was stopped, an image captured by the acquisition unit when an object approached within a range of a predetermined distance from the vehicle, or an image captured by the acquisition unit before the determination unit determines whether or not the subject person is carrying baggage.

5. An entry system comprising:

the image recognition system according to claim 1; and a control unit that automatically opens and closes a door of the vehicle, wherein, when the determination unit of the image recognition system determines that the subject person is carrying baggage, the control unit automatically opens the door closest to the subject person.

6. The entry system according to claim 5, wherein, when the determination unit of the image recognition system determines that the subject person is carrying baggage in each of left and right hands, the control unit automatically opens the door closest to the subject person.

7. An image recognition method to be executed by a computer of an image recognition system, the image recognition method including:

an acquisition step of acquiring a captured image from a camera mounted on a vehicle;

a recognition step of recognizing a human in the captured image; and a determination step of taking the human in the captured image as a subject person and determining, from the captured image, whether or not the subject person is carrying baggage, wherein the determination step extracts a partial image from the captured image, the partial image having a predetermined shape and size and including a hand of the subject person in the captured image, and, when an image pattern different from a background image in the partial image is recognized at a tip of the hand in the partial image, determines that the subject person is carrying baggage.

* * * * *